United States Patent [19]

Li et al.

[11] Patent Number: 5,149,391
[45] Date of Patent: Sep. 22, 1992

[54] PREPREG MACHINE WITH A SINGLE ENDLESS CONVEYOR BELT

[75] Inventors: Hsin L. Li, Parsippany; Dusan C. Prevorsek, Morristown, both of N.J.

[73] Assignee: Allied-Signal Inc., Morristownship, N.J.

[21] Appl. No.: 734,074

[22] Filed: Jul. 22, 1991

Related U.S. Application Data

[63] Continuation of Ser. No. 281,585, Dec. 9, 1988, abandoned.

[51] Int. Cl.[5] .................................. B32B 5/12
[52] U.S. Cl. .................................. 156/441; 156/181; 156/436; 156/498; 156/499; 156/583.5; 425/373; 100/153
[58] Field of Search ............. 156/166, 180, 181, 441, 156/436, 324, 498, 499, 583.5; 425/373, 90; 100/153

[56] References Cited

U.S. PATENT DOCUMENTS

| | | |
|---|---|---|
| 3,345,230 | 10/1967 | McClean .................. 156/181 |
| 3,734,814 | 5/1923 | Davis, Sr. et al. .......... 156/324 X |
| 3,898,113 | 8/1975 | Meyer et al. ............... 156/441 X |
| 4,362,585 | 12/1982 | de Antonis et al. ......... 156/62.2 |
| 4,486,172 | 12/1984 | Dunning ................... 432/140 X |
| 4,543,145 | 9/1985 | Schnell et al. ............. 156/324 |
| 4,549,920 | 10/1985 | Cogswell et al. ........... 156/441 X |
| 4,597,818 | 7/1986 | Aoyama et al. ............ 156/324 X |
| 4,734,321 | 3/1988 | Radvan et al. ............. 156/62.2 X |
| 4,820,568 | 4/1989 | Harpell et al. ............. 428/302 X |
| 4,883,551 | 11/1989 | Britton ..................... 156/181 |
| 4,883,700 | 11/1989 | Harpell et al. ............. 428/113 |
| 4,916,000 | 4/1990 | Li et al. .................... 428/114 X |

FOREIGN PATENT DOCUMENTS

0291267 11/1988 European Pat. Off. ............ 156/164

Primary Examiner—Jeff H. Aftergut

[57] ABSTRACT

A device for forming a resin impregnated unidirectional fiber reinforced prepreg where the resin impregnated fiber web is supported by a single endless conveyor belt. The device includes a pair of pull rolls which exert force directly and longitudinally onto the conveyor belt and the web.

18 Claims, 1 Drawing Sheet

PREPREG MACHINE WITH A SINGLE ENDLESS CONVEYOR BELT

RELATED APPLICATIONS

This application is a continuation of Ser. No. 281,585, filed Dec. 9, 1988, now abandoned.

BACKGROUND OF THE INVENTION

This invention is in the field of apparatus useful for making fibrous composites; more particularly, the invention relates to an apparatus and method useful to make coated unidirectional fibrous webs.

Thermosetting and thermoplastic fibrous reinforced sheets and method of making them are known in the art. U.S. Pat. No. 4,362,585 discloses fiber reinforced plastics and an apparatus and methods to make them. A uniaxial oriented nylon film is used as a carrier web or top web for fiber reinforced plastics. At column 5 beginning at line 11 an embodiment is disclosed where only a top film is used. It is disclosed that under certain conditions resin and fiber are fed onto a carrier means such as a conveyor belt or carrier web other than uniaxial drawing nylon film.

U.S. Pat. No. 4,486,172 discloses an oven and method for heating thermoplastic articles. The articles are fed into the oven on a conveyor belt to uniformly heat the article.

U.S. Ser. No. 081,074 disclosed layers made from multi-filament yarn impregnated or coated with a matrix resin. The process is generally disclosed as comprising the steps of bringing the yarn in sheet form onto a carrier web and bringing the yarn laid in unidirectional sheet form into contact with the matrix resin. The matrix resin can be in the form of solution, emulsion or melt. The next step is to consolidate the resin impregnated sheet. This can be accomplished by drying to remove solvent or cooling to solidify the melt. The prepreg sheet is then rolled up and cut for use. In the apparatus and method disclosed the unidirectionally laid yarn is supported by a continuous carrier web through the steps of impregnating with resin and heating in a drying oven. The carrier webs used had to be strong enough to withstand the high tension needed to be pulled through the prepreg process. Typically, the carrier web was made of high strength silicone paper, which is very costly.

SUMMARY OF THE INVENTION

The present invention is directed to an improved apparatus and related method for making prepregs.

A fibrous web is a layer defined by a plurality of fibers. Typically, the layer is thin and defines a surface, with the major plane of the web corresponding to the surface of the web. Preferably, the fibrous web is a tape or layer in which the fibers are unidirectional. By unidirectional it is meant that the fibers are substantially parallel to each other within the web.

For the purpose of the present invention a prepreg is a composite of a fibrous web coated or impregnated with a matrix composition which is preferably a polymeric composition. The polymeric composition can be a thermoplastic or thermosetting polymer based composition. The axial direction of the web is the axial direction of the apparatus.

The present invention is an improved prepreg machine where an advancing web of unidirectional fiber coated with a matrix composition is supported and conveyed through an oven. The machine uses an endless conveyor belt to support the coated web being conveyed through the oven. The conveyor belt provides vertical support for the advancing fibrous web. It assures that the plurality of fibers and the added matrix material remain in their relative position. The advancing fibrous web advances through the oven by pull means which pull the fibers of the web in the longitudinorial direction. The force to pull is exerted in the longitudinal direction directly on the fibers as web as the conveyor belt. The force is sufficient to pull the fibrous web through as the prepreg layer is made. Preferred pull means is at least one set of pull rolls. The surface of the conveyor belt travel together with the fibrous web.

In specific and preferred embodiments the prepreg machine further comprises a first heater (hereinafter referred to as the heater) to heat the supported, coated web. The heater is located to heat the coated web prior to entrance of the coated web into a second heating means referred to as an oven. There can be a cooling means between the heater and the oven to cool or chill the coated web. The heater and cooler can be used in combination with means such as pressure actuated rollers to compact and consolidate the coating composition and fibrous web, and to attain uniform thickness.

The present invention also includes a method which comprises conveying a web of unidirectional fiber coated with a coating composition through an oven on a conveyor belt. The method can further comprise heating the coated web on the conveyor belt prior to conveying the web thorugh the oven. Optionally the heated impregnated web can be cooled or chilled after heating and prior to conveying through the oven.

The apparatus can be used to prepare prepregs where the prepreg is heated using the heater and optionally cooled and the oven not used. Alternatively, only the oven can be used. Finally, all of the heater and cooling means and the oven can be used.

In accordance with the present invention the unidirectional fibrous web can be coated on the conveyor belt. The coated web supported on the conveyor belt, can be heated by a heater followed by chilling and then passed through an oven. The prepreg exiting the oven is then removed from the conveyor belt. The portion of the conveyor belt from which the prepreg is removed can pass through a cleaning station prior returning to process additional fibrous web.

The presence of the heater means, and the chilling means in addition to the oven permit the prepreg machine of the present invention to use a variety of different coating compositions to coat a unidirectional fibrous web. The heater and chilling means allow controlled processing of the prepreg composite prior to passing through the oven.

The apparatus to the present invention is particularly useful in a method to make thin prepregs of from 0.0005 to 0.005 inches thick made of high strength fiber, as web as prepregs which are greater than 0.0058 inches thick.

DESCRIPTION OF THE PREFERRED EMBODIMENTS

Figure 1:
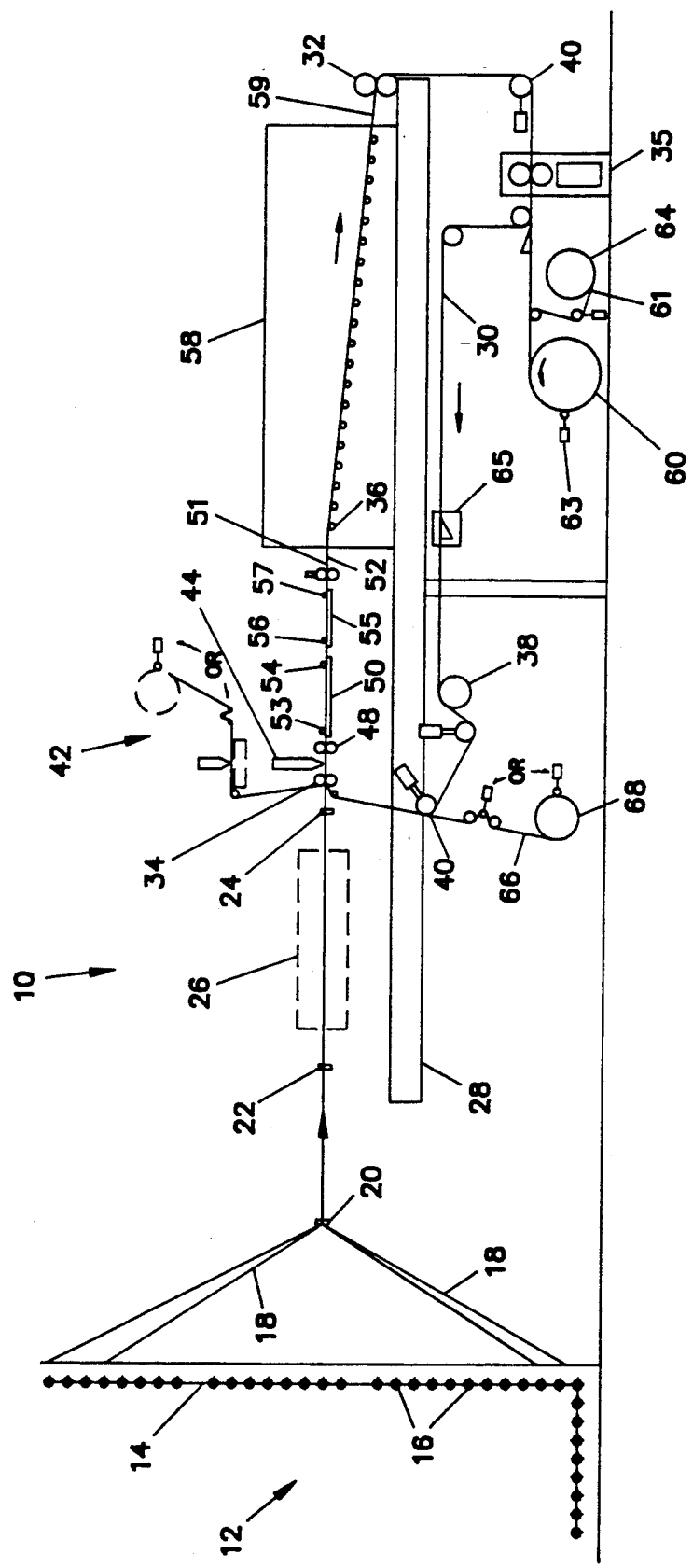
FIG. 1 is a schematic diagram of a preferred embodiment of an apparatus of the present invention.

The present invention is a new and improved apparatus and method for manufacturing prepregs.

A plurality of fibers are unidirectionally aligned to form a web. Preferably the web is in one plane. A matrix composition is deposited on the web. The matrix composition is preferably a polymeric composition which can be selected from thermoplastic and/or thermosetting resin compositions. A sufficient amount of the matrix composition is used to structurally maintain the unidirectional fibers relative to each other at least on a supported web. The matrix composition can be coated only on the surface of the web, completely impregnated into the web, or the web embedded in the matrix composition. The type of coating depends on the matrix composition, the manner of applying the matrix composition and the amount of coating composition used. The following description will be made considering coating the web, although any useful method of deposition of matrix composition can be used.

An advancing web of unidirectional fiber coated with a matrix composition is supported while advancing through an oven using an endless conveyor belt. The advancing fibrous web advances through the oven by pull means which pull the fibers in the web in a longitudinal direction. Preferably, the pull means is at least one set of pull rolls. The force to pull is exerted in the longitudinal direction directly on the fibers as web as the conveyor belt. The force is sufficient to pull the fibrous web as the prepreg layer is made.

In specific and preferred embodiments of the present invention, fiber is supplied from a fiber supply means. Fibers are formed into a unidirectional fibrous web. A preferred means to orient the fibers with respect to each other is to use a comb means which collimates the plurality of fibers parallel to one another. The web is coated with a matrix composition by a suitable means. The coated web is supported on a conveyor belt and advances through an oven to be heated. Preferably the conveyor belt is positioned to support the web and the means to coat is positioned to coat the supported web. Optionally there can be a heater to heat the supported web. Preferably the heater is a heated platen. The conveyor belt passes over and in contact with the platen. The heated supported coated web then passes to an oven. There can be a cooling means located between the heated platen and the oven.

There is preferably a first compacting means to consolidate the matrix composition and the fibrous web associated with the heater. A preferred means is a compaction roller which is pressure actuated. The conveyor belt and coated web pass between the roll and a platen heater. The roll presses against the platen compacting the matrix composition into the fiber web as they pass between the roll and the platen at the heater. Alternately, a pair of compression rolls can be located immediately after the heater. After the coated web passes the heating means, it can pass through a cooling means where it is cooled to maintain the web thickness. Preferably, the web passes over a chilled platen. There can be a second composition means to assert pressure on the coated web as it passes over the chilled platen. There can be a means to assert pressure on the coated web as it passes over the chilled platen. Preferably, pressure actuated rolls are used. This assures a uniform thickness of the prepreg.

The matrix resin can be uniformly or nonuniformly distributed. A preferred process to nonuniformly distribute the resin and prepregs so made are described in copending Ser. No. 276,520, issued as U.S. Pat. No. 5,061,545, and 276,739.

There can be a bottom sheet which is between the conveyor belt and the fibrous web. The bottom sheet is not a carrier web. It does not pull or carry the coated web. The bottom sheet is used to prevent sticking of the coated web to the conveyor belt and to enable the coated web to be rolled up without sticking to itself. The bottom sheet can be removed prior to wind up. Optionally, there can be a top sheet placed on top of the coated fibrous web. Alternately, a release agent can be applied to the conveyor belt to prevent sticking to the prepreg being formed.

The method of the present invention permits the use a lower cost bottom sheet which does not require the physical strength a carrier web since the conveyer belt supports the forming prepreg. The tension on the impregnated web and bottom sheet is incurred by the unidirectional fibers of the web.

A specific and preferred embodiment of the present invention is illustrated in FIG. 1. The prepreg machine of the present invention is generally shown as reference character 10. The components necessary to control and support the apparatus in ending the conveyor belt can be supported by a suitable frame such as frame 28. Other portions can be supported on the ground or floor. There is a fiber supply 12. The fiber supply 12 is a creel 14 having a plurality of spools 16. Fiber 18 is fed from the fiber supply 12 to a means to form the fiber into a unidirectional web. In the embodiment in FIG. 1, the means to form the fiber into a web is a series of combs. There is at least one coarse comb 20 to align the fibers in a common plane. Downstream fine combs 22 can have comb teeth spaced closer together until a desired number of fiber ends per inch is achieved and the fibers are unidirectionally spaced relative to one another. There can optionally be drying of the fibrous web by a drying means 26 between fine comb 22 and fine comb 24. The combs and drying means are kept in relative position by a frame 28. The dryer 26 can be a heated dryer, heated by infrared radiation, or hot air heated, the latter being preferred. The dryer 26 is used to eliminate or reduce moisture in the fiber, and/or preheat the fiber before the fibrous web enters the coating station.

The unidirectional fibrous web is then coated with a matrix composition. Preferably the fibrous web is first fed onto the supporting surface of endless conveyor belt 30. Conveyor belt 30 vertically supports the fibrous web. The conveyor belt continuously circulates through a continuous path. Idler and tension controls are provided as necessary. The conveyor belt circulates in a direction as the fibrous web travels in a path away from the combs. The fibrous web is supported on the conveyor belt and pulled along with the conveyor belt by suitable pull means such as at least one set of pull rolls 32. In the embodiment illustrated in FIG. 1, the fibrous web is first supported by the conveyor belt 30 immediately ahead of positioning roll 34. The fibrous web is conveyed through the various coating and treating stations supported on conveyor belt 30.

The apparatus preferably has a back up or second set of pull rolls 35. The conveyor belt can have suitable support or idler rolls 36, tension control rolls 38 and steering rolls 40. The fibrous web is thereby supported and conveyed by conveyor belt 30.

The fibrous web is preferably coated with matrix composition while supported on the conveyor belt 30. A useful coating station 42 is illustrated in FIG. 1. Preferably the coater is a transverse coater 44. There is a set of positioning rolls 34 and a set of gauge rolls 48 downstream from the transverse coater 44. The positioning rolls 34 hold the fibers in position while transverse coater 44 deposit the matrix composition along the total transverse direction of the fibrous web. Gauge rolls 48 are provided to maintain a controlled thickness of the coated web. A useful transverse coater is the "Uhing" linear drive made by Amicoil, Inc. of Aston Pa.

The coated web advances from the coating station 42 to a heater means. A preferred heater is platen heater 50. The conveyor belt 30 has an outside surface 51 on which the fibrous web is supported, and an inside surface 52 on which the conveyor belt 30 is supported. The platen heater is located close to and preferably in contact with the conveyor belt inside surface 52. While the specific dimensions can be varied depending on the materials used and the product to be made, a useful platen is 36 inches long (in the axial direction) and can heat a coated web traveling at a speed of up to 50 feet per minute and typically 30 feed per minute from room temperature up to 120° C., and typically to 100° C. The platen heater is used to heat the supported web through the conveyor belt by conduction to apply a uniform heat to the web. This is important when using certain polymers such as epoxy which requires immediate hardening (B stating).

There can be a first means to compact the fibrous web and matrix composition associated with the heater means. The compacting means can be at least one set of compression rollers. In the embodiment illustrated in FIG. 1 there are two compaction rollers, although only one is necessary and more than two can be used. First heating compaction roll 53 and second heating compaction roll 54 assert pressure as the coated fibrous web and the conveyor belt pass between the compaction rolls and the platen 50. The pressure causes the matrix composition to consolidate with the fibrous web. The compaction rolls also control the thickness of the impregnated web.

The supported web can then be conveyed to an optional cooling means which is preferably a chilled platen. The chilled platen is preferably in contact with the inside surface 52 of the conveyor belt for uniform cooling. While the specific dimensions can be varied depending on the materials used and the product to be made, a useful chilled platen is 24 inches (in the axial direction) and can cool a web traveling at up to 50 feet per minute and typically 30 feet per minute from 120° C. to room temperature.

There can be second compacting means to compact the fibrous web and matrix composition after the cooling station. The compacting means can be at least one set of compression rollers. In the embodiment illustrated in FIG. 1 there are two compaction rollers, although only one is necessary and more than two can be used. First cooling compaction roll 56 and second cooling compaction roll 57 assert pressure as the coated fibrous web and the conveyor belt pass between the compaction rolls and the cooling platen 55. The pressure causes the matrix composition to consolidate with the fibrous web. The compaction rolls also control the thickness of the impregnated web.

The coated web advances from the coater to oven 58. The oven is provided to heat the coated web. Preferably the oven is a convection type oven which uses a heated gas such as air to heat the coated web. Heating in this manner is applied to drive off volatile components of the coating composition and to cause any chemical reaction which may be desirable. Other type ovens such as conducting and radiation ovens can be used.

Upon exiting the oven at oven exit 59 and passing through pull rolls 32, the prepreg is made ready to be collected for storage. The prepreg can be cut to flat sheets or rolled up and stored as desired. In the embodiment shown in FIG. 1 the prepreg is rolled on a suitable means such as product rewinder roll 60. The tension between the pull rolls 32 and rewinder roll 60 can be less than the tension between the creel 14 and pull rolls 32. The tension can be only that which is sufficient to wind up the prepreg. Using low tension is desirable to facilitate removal of the prepreg from the liner 61. A liner 61 can be used as desired when the prepreg is wound on product wind roll 60. The liner 61 is used to prevent the prepreg from sticking to itself in storage and to protect the structure of the prepreg during rolling. In FIG. 1, product rewind roll is shown with an appropriate tension control 63. The liner is supplied from a liner roll 64. This can be very inexpensive compared to the more expensive silicone paper used as a liner and carrier web in the past.

The conveyor belt 30 continues to travel through its path without the coated web. There can be a suitable belt cleaning means 65, to clean the belt during operation.

Optionally, there can be a means to provide a bottom substrate layer 66. The substrate layer is inserted between the fibrous web and the outside surface 51 of the conveyor belt. The substrate layer can help to protect the conveyor belt when the coating composition contains materials that may stick or be detrimental to the surface of the belt, and act as a liner. The substrate 66 is shown being fed from substrate feed roll 68.

The conveyor belt can be made of any suitable material depending on the material in the coated web composition. Useful conveyor belts are conveyor belts made of metals, and reinforced polymers such as polytetrafluoroethylene. Most preferably the conveyor belt is a metal conveyor belt preferably made of copper and beryllium. The conveyor belt should be flexible yet strong and be able to withstand temperatures of up to 400° C. and typically up to 200° C. The conveyor belt should be able to be exposed to a variety of coating compositions and maintain its release properties. The conveyor belt can be as wide as needed. Preferably, the conveyor belt is from 0.5 to 8 feet, more preferably from 1 to 6 feet wide. A typical commercial size conveyor belt is 6 feet wide. A useful conveyor belt is described in U.S. Pat. No. 4,486,172 incorporated by reference.

For the purposes of the present invention, fiber is an elongated body, the length dimension of which is much greater than the transverse dimensions of width and thickness. Accordingly, the term fiber includes monofilament fiber, multifilament fiber, ribbon, strip, a plurality of any one of combinations thereof and the like having regular or irregular cross-section.

The apparatus and method of the present invention are particularly useful for making thin prepregs from very fine fibers. The fiber can be thin, having filament diameter from 0.0005 to 0.002, and preferably 0.0008 to 0.002; or thick having a filament diameter of greater then 0.002 inches. This can result in thin prepreg layers having thickness of as low as 0.001 inches or lower. Typically, the fiber is in multifilament yarn. During the formation of the yarn into a fibrous web the yarn tends to flatten out.

The prepreg layer of the present invention typically contain from 5 to 30 fiber ends per inch and preferably 10 to 20 per inch for an extend claim polyethylene yarn having 1200 denier per 118 filaments. Each layer is typically from about 0.0008 to 0.015, preferably 0.0015 to 0.01, more preferably 0.0015 to 0.005, and most preferably 0.0015 to 0.0025 inches thick. Thin prepreg layers of from about 0.0005 to 0.005 can be made by the present invention. The prepreg layer is typically from 1 to 10 times in thickness of the diameter of the fiber.

The proportion of matrix to fiber is variable for the prepreg composites, with matrix material amounts of from about 2% to about 95%, by volume, representing the broad general range. Within this range, it is preferred to use composite prepregs having a relatively high fiber content, such as composites having only 5–50% by volume matrix material, by weight of fibers, and more preferably 5–30% by volume matrix material. For multiple layered composites made from the prepreg layers ballistic protection, the fiber comprises at least about 50 volume percent. and most preferably at least about 70 volume percent, with the matrix occupying the remaining volume.

Composites made using the prepreg layer are made using the above-described fibrous elements. A preferred way to make the prepregs is to lay-up individual layers and heat them and form them into the desired configuration. Suitable means include compression molding, stamping, or heating under pressure within an autoclave.

Depending on the application for use of the prepreg layer of the present invention different fibers and different matrices can be used. The yarn useful in the present invention can have from 2 to 1000 preferably 50 to 500 and more preferably 75 to 200 filaments per yarn bundle. Useful fibers include polyolefin based polymers and particularly ultra high molecular weight polyolefin fibers including polethylene and pclypropylene fibers. Other useful high strength fibers include aramid fibers, polyvinyl alcohol fibers and other high strength fibers. Also useful in the present invention are a variety of conventional fibers which would result in improvement in resistance to impact properties when used in accordance with the present invention. Such fibers include but are not limited to asbestos, carbon, graphite, boron, cellulose, alumina, and metal fibers.

High strength fiber particularly preferred for use in the present invention include highly oriented ultra-high molecular weight polyethylene fiber, highly oriented ultra-high molecular weight polypropylene fiber, aramid fiber, polyvinyl alcohol fiber or combinations thereof. The high strength fibers preferably have a tensile modulus of at least about 160 grams/denier and preferably at least about 500 grams/denier and a tenacity of at least about 7 grams/denier and preferably at least 22 grams/denier. Measured according to ASTM 2256 using 4D tire clamps, on an Instron testing machine at an elongation of 100%/minute. U.S. Pat. No. 4,457,985 generally discusses such oriented ultra high molecular weight polyethylene and polypropylene fibers, and disclosure of which is hereby incorporated by reference to the extent not inconsistent herewith. In the case of polyethylene, suitable fibers are those highly oriented fibers cf weight average molecular weight of at least about 200,000, preferably at least 500,000, more preferably at least about one million and most preferably between about two million and about five million. Layers are particularly useful when made of extended chain polyethylene having a yarn denier of about 1200 denier/118 filaments.

The fibers may be precoated with a polymeric material preferably an elastomer based material prior to being arranged as described above. Preferably the elastomeric material has a tensile modulus, measured at about 23° C., of less than about 20,000 and preferably less than 6,000 psi (41,400 kPa). Preferably, the tensile modulus of the elastomer is less than about 5,000 psi (34,700 kPa), and most preferably is less than about 2,500 (17,250 kPa) to provide even more improved performance. The glass transition temperature (Tg) of the elastomer (as evidenced by a sudden drop in the ductility and elasticity of the material) should be less than about 0° C. Preferably, the Tg of the elastomer is less than about −40° C., and more preferably is less than about −50° C. The elastomer should have an elongation to break of at least about 50%. Preferably, the elongation to break is at least about 100%, and more preferably, it is about 300% for more superior performance.

The areal density is used to indicate the amount of fiber and/or resin per unit area of the prepreg layer. It is determined by the number of yarn strands laid per unit width of prepreg sheet and the amount of resin applied to the yarn. Typically if a 1200 denier/118 filament yarn is laid by 15 ends per inch the yarn aerial density in the prepreg sheet would be about 79 grams per square meter.

Suitable matrix materials include polyethylenes, cross-linked polyethylenes, polypropylenes, ethylene copolymers, propylene copolymers and other olefin polymers and copolymers. Examples of such other matrix materials include unsaturated polyesters, phenolics, polybutyrals, epoxy resins and polyurethane resins and other low modulus resins curable below the melting point of the fiber.

A wide variety of elastomeric materials and formulations may be utilized in this invention. Representative examples of suitable elastomers have their structures, properties, and formulations together with crosslinking procedures summarized in the Encyclopedia of Polymer Science, Vol. 5, "Elastomers-Synthetic" (John Wiley & Sons Inc., 1964). The matrix materials of this invention preferably have low moduli as noted above. For example, any of the following materials may be employed: polybutadiene, polyisoprene, natural rubber, ethylene-propylene copolymers, ethylenepropylene-diene terpolymers, polysulfide polymers, polyurethane elastomers, chlorosulfonated polyethylene, polychloroprene, plasticized polyvinylchloride using dioctyl phthalate or other plasticers web known in the art, butadiene acrylonitrile elastomers, poly(isobutylene-co-isoprene), polyacrylates, polyesters, polyethers, fluorelastomers silicone elastomers, thermoplastic elastomers, copolymers of ethylene. Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments.

The matrix composition material may be compounded with fillers such as carbon black, silica, glass microballoons, etc. up to an amount not to exceed about 300% by weight of elastomer, preferably not to exceed about 100% by weight and may be extended with oils and vulcanized by sulfur, peroxide, metal oxide or radiation cure systems using methods web known to rubber technologists of ordinary skill. Blends of different elastomeric materials may be used together or one or more elastomer materials may be blended with one or more thermoplastics. High density, low density, and linear low density polyethylene may be cross-linked to obtain a material of appropriate properties, either alone or as blends. The modulus of such modified compound refers to the total matrix composition.

The proportion of coating on the coated fibers or fabrics may vary from relatively small amounts (e.g. 1% by weight of fibers) to relatively large amounts (e.g. 150% by weight of fibers), depending upon whether the coating material has impact or ballistic-resistant properties, and upon the rigidity, shape, heat resistance, wear resistance, flammability resistance and other properties desired for the composite article. In general, ballistic-resistant articles of the present invention containing coated fibers should have a relatively minor proportion of coating since the ballistic-resistant properties are almost entirely attributable to the fiber. Nevertheless, coated fibers with higher coating contents may be employed. Useful amounts of coating, based upon the weight of the fiber range from 5 to 100, preferably 10 to 50, and most preferably 10 to 30 percent.

The coating may be applied to the fiber in a variety of ways. The fiber resin can be melt coated onto the fibrous web. One method is to apply the resin of the coating material to the stretched high modulus fibers either as a liquid, a sticky solid or particles in suspension, or as a fluidized bed. Alternatively, the coating may be applied as a solution or emulsion in a suitable solvent which does not adversely affect the properties of the fiber at the temperature of application. While any liquid capable of dissolving or dispersing the coating polymer may be used, preferred groups of solvents include water, paraffin oils, ketones, alcohols, aromatic solvents or hydrocarbon solvents or mixtures thereof, with illustrative specific solvents including paraffin oil, xylene, toluene and octane. The techniques used to dissolve or disperse the coating polymers in the solvents will be those conventionally used for the coating of similar elastomeric materials on a variety of substrates.

Other techniques for applying the coating to the fibers may be used, including coating of the high modulus precursor before the high temperature stretching operation, either before or after removal of the solvent from the fiber. The fiber may then be stretched at elevated temperatures to produce the coated fibers. The extruded gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber passes into the cooling solution. Alternatively, the fiber may be extruded into a fluidized bed of the appropriate polymeric powder.

What is claimed is:

1. An improved prepreg machine of a type in which a fibrous web of unidirectional fiber, the fibrous web having a bottom surface, is supported and advances through a coating station where a matrix composition is deposited on the web and then through an oven, downstream from the coating station, the improvement comprising: only one endless conveyor belt to vertically support the advancing fibrous web directly on a bottom surface of the fibrous web, a pull means comprising at least one set of driven pull rolls, wherein one of said pull rolls is in direct contact with an underside of the endless belt and a second of said pull rolls is in direct contact with the fibrous web to simultaneously exert force directly and longitudinally onto the conveyor belt and the fibrous web to advance the conveyor belt and the fibrous web, and a means to feed a bottom sheet between the fibrous web and the conveyor belt.

2. The machine of claim 1 wherein the improvement further comprises a heater located between the coating station and the oven.

3. The machine of claim 2 wherein the conveyor belt comprises an outside surface on which the fibrous web is supported and an inside surface on which the conveyor belt is supported, the heater comprising a platen heater in contact with the inside surface of the conveyor belt.

4. The machine of claim 3 wherein the improvement further comprises a first compacting means associated with the heater.

5. The machine of claim 4 wherein the first compacting means comprises a first compacting roll, a means to direct the first compacting roll to exert pressure on the conveyor belt, the fibrous web and matrix composition advancing between the first compacting roll and the heated platen.

6. The machine of claim 2 wherein the improvement further comprises a cooling means between the heater and the oven.

7. The machine of claim 6 wherein the conveyor belt comprises an outside surface on which the fibrous web is supported and an inside surface on which the conveyor belt is supported, the cooling means comprising a platen in contact with the inside surface of the conveyor belt.

8. The machine of claim 7 wherein the improvement further comprises a second compacting means associated with the cooling means.

9. The machine of claim 8 wherein the second compacting means comprises a second compacting roll, a means to direct the second compacting roll to exert pressure on the conveyor belt, the fibrous web and matrix composition advancing between the second compacting roll and the cooled platen.

10. The machine of claim 1 wherein a means to feed a liner sheet is positioned downstream from the oven.

11. An apparatus comprising:
a fiber supply means;
a means to form fiber form the fiber supply means into a unidirectional fibrous web, the web having a bottom surface;
a means to coat the unidirectional fibrous web with a coating composition to form a coated web;
an oven to heat the coated web;
a means to feed a bottom sheet between the undirectional fibrous web and an endless conveyor belt;
the endless conveyor belt positioned to support the coated unidirectional fibrous web directly on its bottom surface and advance the unidirectional fibrous web past the means to coat and the oven; and a pull means comprising at least one set of driven pull rolls, wherein one of said pull rolls is in direct contact with an underside of the endless belt and a second of said pull rolls is in direct contact with the unidirectional fibrous web to simultaneously exert force directly and longitudinally onto the conveyor belt and the fibrous web to advance the conveyor belt and the unidirectional fibrous web.

12. The apparatus of claim 11 wherein there is a heater to heat the supported coated web between the means to coat and the oven.

13. The apparatus of claim 12 wherein there is a cooling means to cool the web between the heater and the oven.

14. The apparatus of claim 13 wherein there is a second compacting means associated with the cooling means.

15. The apparatus of claim 12 wherein there is a compacting means associated with the heater.

16. The apparatus of claim 11 wherein there is a means to feed a top sheet on top of the coated web.

17. The apparatus of claim 11 wherein said second pull roll and the supporting conveyor belt are spaced apart such that together they are capable of providing a sheet having a thickness ranging from 0.0005 to 0.005 inches.

18. The apparatus of claim 11 wherein a means to feed a liner sheet is positioned downstream from the oven.

* * * * *

UNITED STATES PATENT AND TRADEMARK OFFICE
CERTIFICATE OF CORRECTION

PATENT NO. : 5,149,391
DATED : September 22, 1992
INVENTOR(S) : Hsin L. Li, et. al.

It is certified that error appears in the above-indentified patent and that said Letters Patent is hereby corrected as shown below:

Column 10, Claim 11, line 58, (second occurring) "form" should be -- from --.

Signed and Sealed this

Twenty-eighth Day of September, 1993

Attest:

BRUCE LEHMAN

Attesting Officer  Commissioner of Patents and Trademarks